US012783129B2

(12) United States Patent
Gundecha et al.

(10) Patent No.: US 12,783,129 B2
(45) Date of Patent: Nov. 3, 2026

(54) ADAPTIVE WEAR-LEVELING OF SUB-BLOCKS IN NON-VOLATILE MEMORY

(71) Applicant: SANDISK TECHNOLOGIES, INC., Milpitas, CA (US)

(72) Inventors: Disha Gundecha, Pune (IN); Raghavendra Gopalakrishnan, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 329 days.

(21) Appl. No.: 18/382,860

(22) Filed: Oct. 23, 2023

(65) Prior Publication Data

US 2025/0130719 A1 Apr. 24, 2025

(51) Int. Cl.
*G06F 3/06* (2006.01)

(52) U.S. Cl.
CPC .......... *G06F 3/0616* (2013.01); *G06F 3/0631* (2013.01); *G06F 3/0644* (2013.01); *G06F 3/0679* (2013.01)

(58) Field of Classification Search
CPC .... G06F 3/0616; G06F 3/0631; G06F 3/0644; G06F 3/0679; G06F 3/064
USPC .................................................. 711/103, 154
See application file for complete search history.

(56) References Cited

U.S. PATENT DOCUMENTS

| | | | | |
|---|---|---|---|---|
| 9,082,492 | B2 | 7/2015 | Kwak | |
| 9,466,382 | B2 * | 10/2016 | Avila | G11C 16/26 |
| 9,620,201 | B1 | 4/2017 | Lai | |
| 11,366,597 | B2 | 6/2022 | Peter | |
| 2014/0133232 | A1 * | 5/2014 | Avila | G11C 16/26 365/185.11 |
| 2014/0189284 | A1 * | 7/2014 | Hyuseinova | G06F 12/10 711/206 |
| 2024/0264932 | A1 * | 8/2024 | Yoo | G11C 16/16 |
| 2025/0251870 | A1 * | 8/2025 | Kang | G06F 3/064 |

FOREIGN PATENT DOCUMENTS

CN 115620790 A 1/2023

* cited by examiner

*Primary Examiner* — Than Nguyen
(74) *Attorney, Agent, or Firm* — Arlene P. Neal; NEAL BLIBO LLC

(57) ABSTRACT

A storage device may maintain data reliability between sub-blocks by executing wear leveling operations such that a program-erase count (PEC) difference between sister sub-blocks is reduced. The storage device may include a memory device including blocks, and at least one of the blocks may be divided into sister sub-blocks. The storage device may also include a controller to calculate a sister sub-block threshold and process a wear leveling operation. When executing the wear leveling operation, the controller may select a destination block. The controller may also prioritize a first sister block for a multi-layer cell (MLC) flow when the PEC value of a second sister sub-block is greater than the sister sub-block threshold.

19 Claims, 6 Drawing Sheets

ADAPTIVE WEAR-LEVELING OF SUB-BLOCKS IN NON-VOLATILE MEMORY

BACKGROUND

Non-volatile storage devices, such as solid-state drives (SSD) and the like, may include one or more memory devices for storing data and a controller for managing the internal operations of the storage device. The memory device may be a NAND flash memory device that may be divided into partitions. The partitions may be further divided into blocks, wherein blocks are the smallest units that can be erased from the NAND flash memory. The NAND flash memory may be configured in various formats, with the formats being defined by the number of bits that may be stored per memory cell. Different types of NAND flash memory may have different limits as to how many times the individual blocks on the NAND flash can be erased before data can no longer be stored reliably.

To spread the wear and tear across blocks in a memory device and cause the memory device to last longer, the controller may execute wear leveling operations and arrange how data is programmed and/or erased (PE), so the PE cycles are distributed among the blocks in the memory device. The controller may use a wear leveling algorithm to determine which physical block to use each time data is programmed and/or erased. In an existing wear leveling algorithm, the controller may obtain the average program/erase count (PEC) value of the partition and check for the least PEC value associated with a closed block. The controller may determine if the difference between the average PEC value in the partition and the least PEC value associated with a closed block is less than a predefined PEC threshold that is used to maintain PEC values for all blocks within the partition within an expected range. If the difference between the average PEC value in the partition and the least PEC value associated with a closed block is less than a predefined PEC threshold, the data from the closed block associated with the least PEC value (referred to herein as a source block) may be moved to a block in a free blocks pool with the highest PEC value (referred to herein as destination block). The source block may then be moved to the free blocks pool to be used in program/erase operations. In addition to performing the wear leveling relocation, the controller may also allocate the coldest block in the free block pool for multi-layer cell (MLC) flows.

In some NAND flash memory devices, a block may be divided into sub-blocks (also referred to herein as sister sub-blocks), wherein each sub-block is a fraction of the block, and each sub-block may be individually programmed and/or erased. For example, a block may be divided into two or three sister sub-blocks, each of which may be accessed or erased individually. When a sub-block is erased, programmed, and/or read, the data in the sister sub-block(s) may become disturbed. Over a certain number of PE cycles, the disturbance may accumulate to a level that is beyond the system reliability bit-error-rate criteria, and beyond this point, the sister sub-block(s) may need to be refreshed. In, for example, a TLC/Hybrid SLC flash memory, the difference in the PEC values between sister sub-blocks (referred to herein as a sub-block PEC threshold difference) may be less than approximately 100. When the sub-block PEC threshold difference is greater than approximately 100, the sister sub-block with the lower PEC value may need to be refreshed to reliably maintain its data. In a QLC/Hybrid SLC flash memory, the sub-block PEC threshold difference may be less than approximately 50 and when the sub-block PEC threshold difference is greater than approximately 50, the sister sub-block with the lower PEC value may need to be refreshed to reliably maintain its data.

Using the existing wear leveling algorithm, when data is moved from a source block that is a sub-block to a destination block, the sister sub-block of the source block may not be in the free block pool for MLC flow allocation and/or may not be the block associated with the highest PEC value in the free block pool to be chosen as the destination block. As data is programmed/erased on the source block once it is assigned to the free pool, the PEC difference between the sister sub-blocks may reach the sub-block PEC threshold difference and result in data reliability issues on the sister sub-block.

SUMMARY

In some implementations, the storage device maintains data reliability between sub-blocks by executing wear leveling operations such that a program-erase count (PEC) difference between sister sub-blocks is reduced. The storage device may include a memory device including blocks, and at least one of the blocks may be divided into sister sub-blocks. The storage device may also include a controller to calculate a sister sub-block threshold and process a wear leveling operation. In executing the wear leveling operation, the controller may select a destination block. The controller may also prioritize a first sister block for a multi-layer cell (MLC) flow when the PEC value of a second sister sub-block is greater than the sister sub-block threshold.

In some implementations, a method is provided for maintaining data reliability between sub-blocks by executing wear leveling operations such that a PEC difference between sister sub-blocks is reduced. The method includes determining, by a controller, that a memory device is divided into sister sub-blocks and calculating a sister sub-block threshold. The method also includes selecting, by the controller, a destination block for wear leveling and prioritizing allocation of a first sister block for an MLC flow when the PEC value of a second sister sub-block is greater than the sister sub-block threshold.

In some implementations, a method is provided for maintaining data reliability between sub-blocks by executing wear leveling operations such that a PEC difference between sister sub-blocks is reduced. The method includes determining, by a controller, that a memory device is divided into sister sub-blocks and calculating a sister sub-block threshold. The method also includes maintaining a free block pool and an open block pool, selecting a destination block for wear leveling from the free block pool, and allocating the destination block as a wear level block in the open block pool. The method further includes prioritizing allocation of a first sister block for an MLC flow when the PEC value of a second sister sub-block is greater than the sister sub-block threshold, wherein the first sister block is allocated as one of a host hybrid single-layer cell block, a host MLC block, and a relocation MLC block.

Figure 1:
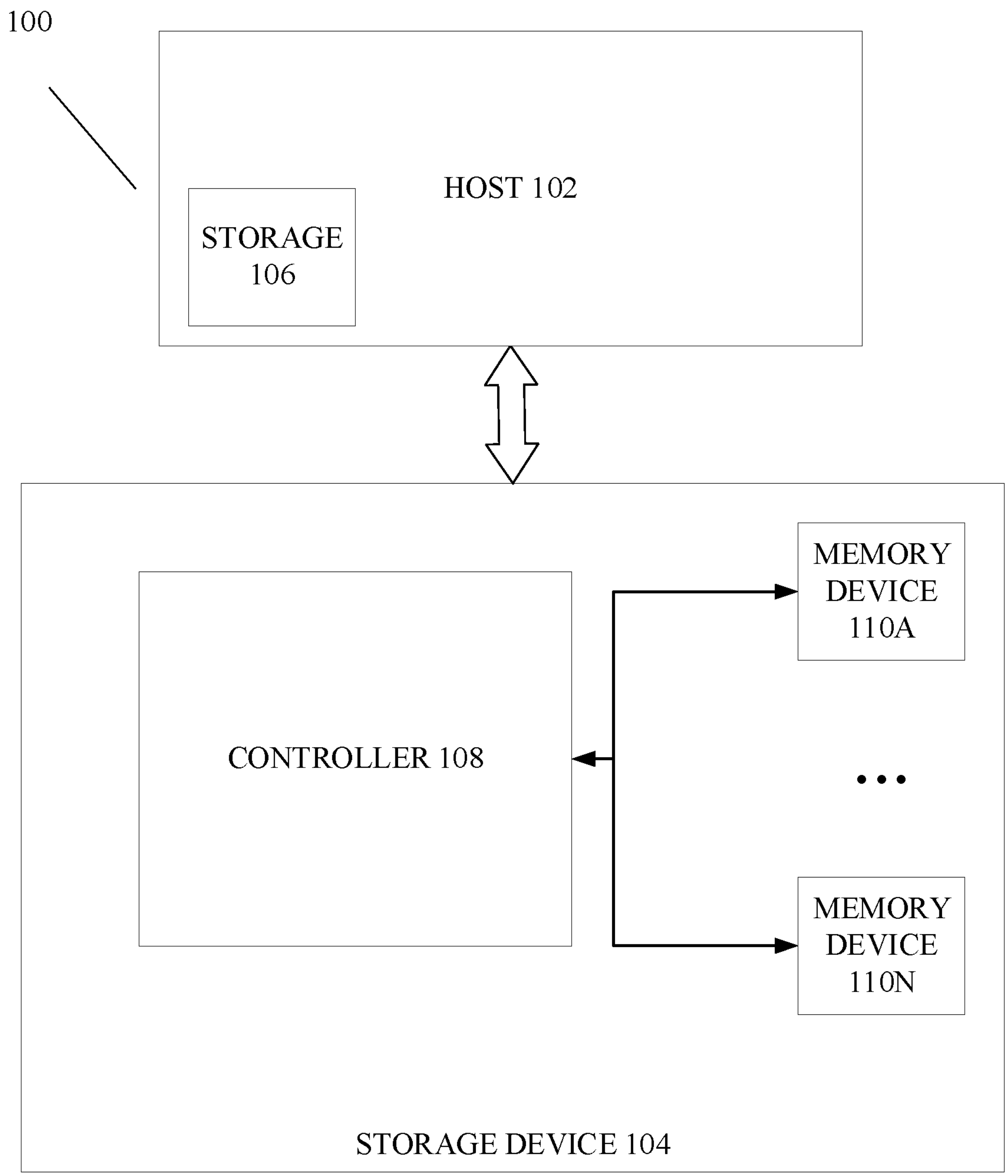
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may include one or more storage components 106 and may transmit commands to read or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108 and one or more memory devices 110*a*-110*n* (referred to herein as memory device(s) 110). Storage device 104 may be, for example, a solid-state drive (SSD), and the like. Memory device 110 may be flash based, including, for example, NAND flash memory. Memory device 110 may be included in storage device 104 or may be otherwise communicatively coupled to storage device 104.

Memory device 110 may be divided into one or more dies, each of which may be further divided into one or more planes that are linked together. The number and configurations of planes within the flash die may be adaptable. Each plane may be further divided into blocks, the smallest unit that may be erased from memory device 110. A block in memory device 110 may be divided into sub-blocks (also referred to herein as sister sub-blocks), wherein each sister sub-block may be a fraction of the block, and each sister sub-block may be individually programmed and/or erased. For example, a block may be divided into two or three sister sub-blocks, each of which may be accessed or erased individually.

Memory device 110 may be configured in various formats, with the formats being defined by the number of bits that may be stored per memory cell. For example, a single-layer cell (SLC) format may write one bit of information per memory cell, a multi-layer cell (MLC) format may write two bits of information per memory cell, a triple-layer cell (TLC) format may write three bits of information per memory cell, and a quadruple-layer cell (QLC) format may write four bits of information per in memory cell, and so on. Writing multiple bits of information per memory cell may reduce the cost of storage device 104 but may increase the wear of the blocks on memory device 110.

Different types of memory devices 110 may have different limits as to how many times the individual blocks on the NAND flash can be programmed/erased before data can no longer be stored reliably. For example, an SLC flash memory may have a limit of approximately 100,000 program/erase (PE) cycles, an MLC flash memory may have a limit of approximately 10,000 PE cycles, a TLC flash memory may have a limit of approximately 5,000 PE cycles, and a QLC flash memory may have a limit of approximately 1,000-100 PE cycles.

Controller 108 may process background operations including, for example, executing internal operations to manage the resources on storage device 104 In managing the resources of storage device 104, controller 108 may execute relocation functions including compaction, read scrubbing, wear leveling, garbage collection, and the like, to move data from one location to another on the memory device, optimize how space on the memory device is used, and improve efficiency. In executing wear leveling operations, controller 108 may arrange data, so that PE cycles are distributed among all the blocks in memory device 110.

When blocks in memory device 110 are arranged in sub-blocks and a sub-block is erased, programmed, and/or read, the data in the sister sub-block(s) may become disturbed, causing an unselected block disturb (USBD) issue. Over a certain number of PE cycles, the disturbance may accumulate to a level that may be beyond the system performance or reliability bit-error-rate criteria, and beyond this point the sister sub-block(s) may need to be refreshed. Controller 108 may therefore calculate a sister sub-block threshold based on memory device 110. The sister sub-block threshold may be kept relatively lower than the PEC difference allowed between sister sub-blocks. For example, in a TLC/Hybrid SLC flash memory, the sister sub-block threshold may be kept relatively lower than the PEC difference of less than approximately 100 allowed between sister sub-blocks. In QLC/Hybrid SLC flash memory, the sister sub-block threshold may be kept relatively lower than the PEC difference of less than approximately 50 allowed between sister sub-blocks.

Consider an example where an MLC/Hybrid SLC block is divided into a first sister sub-block and a second sister sub-block. If the PEC value of the second sister sub-block is higher than the PEC value of the first sister sub-block, controller 108 may determine that the second sister sub-block holds hot data (i.e., data that may have been accessed relatively more frequently) because of the high PEC value of that sub-block. Controller 108 may also determine that the first sister sub-block holds colder data (i.e., data that may not have been accessed frequently) based on its PEC value.

Controller 108 may maintain a free block pool that may include blocks on which data may be programmed and/or erased. The free block pool may include a list of cold free blocks and a list of hot free blocks, wherein the list of cold free blocks may include blocks that have not been programmed and/or erased for a predefined period and/or that may have lower PEC values. The list of hot free blocks may include blocks that have been programmed and/or erased more frequently and/or that may have higher PEC values. The list of cold free blocks may be sorted from cold to coldest, with the coldest block being a block with the lowest PEC value. The list of hot free blocks may be sorted from hot to hottest, with the hottest block being a block with the highest PEC value.

When controller 108 executes a wear-leveling algorithm, controller 108 may select the hottest block from the list of hot free blocks as a destination block. Controller 108 may also determine if the PEC value associated with a sub-block, for example the second sister sub-block, is greater than the sister sub-block threshold. If the PEC value associated with the second sister sub-block is greater than the sister sub-block threshold, controller 108 may determine if the sister sub-block with a lower PEC value, for example, the first sister sub-block, is in the free block pool. If the first sister sub-block is in the free block pool, controller 108 may prioritize allocation of the first sister sub-block for MLC flows and may make the first sister sub-block, for example, a host Hybrid SLC block, host MLC block, and/or a relocation MLC block. Allocating the first sister sub-block with the lower PEC value for MLC flows will cause the PE cycles on that sub-block to increase and reduce the difference in PEC values on the first and second sister sub-blocks.

If the first sister sub-block is not in the free block pool, controller 108 may execute a wear leaving operation that may force relocation on the first sister sub-block, making the first sister sub-block available for program and/or erase operations. Controller 108 may allocate the first sister sub-block for MLC flows and may make the first sister sub-block, for example, a host Hybrid SLC block, host MLC block, and/or a relocation MLC block.

By prioritizing and allocating a sister sub-block associated with a lower PEC value as a hybrid, MLC, and/or relocation block, controller 108 may increase the rate of the PE cycles on the sister sub-block associated with a lower PEC value and increases the PEC value for that sister sub-block. Controller 108 may also reduce the difference in the PEC values associated with sister sub blocks while tackling the sub block wear leveling issue. Controller 108 may also reduce write amplification by removing additional wear levelling path, address the USBD issue, maintain the data reliability between sub-blocks, and improve the overall life of storage device 104 by reducing write amplification.

Storage device 104 may perform these processes based on a processor, for example, controller 108 executing software instructions stored by a non-transitory computer-readable medium, such as storage component/memory device 110. As used herein, the term "computer-readable medium" refers to a non-transitory memory device. Software instructions may be read into memory device 110 from another computer-readable medium or from another device. When executed, software instructions stored in memory device 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2A:
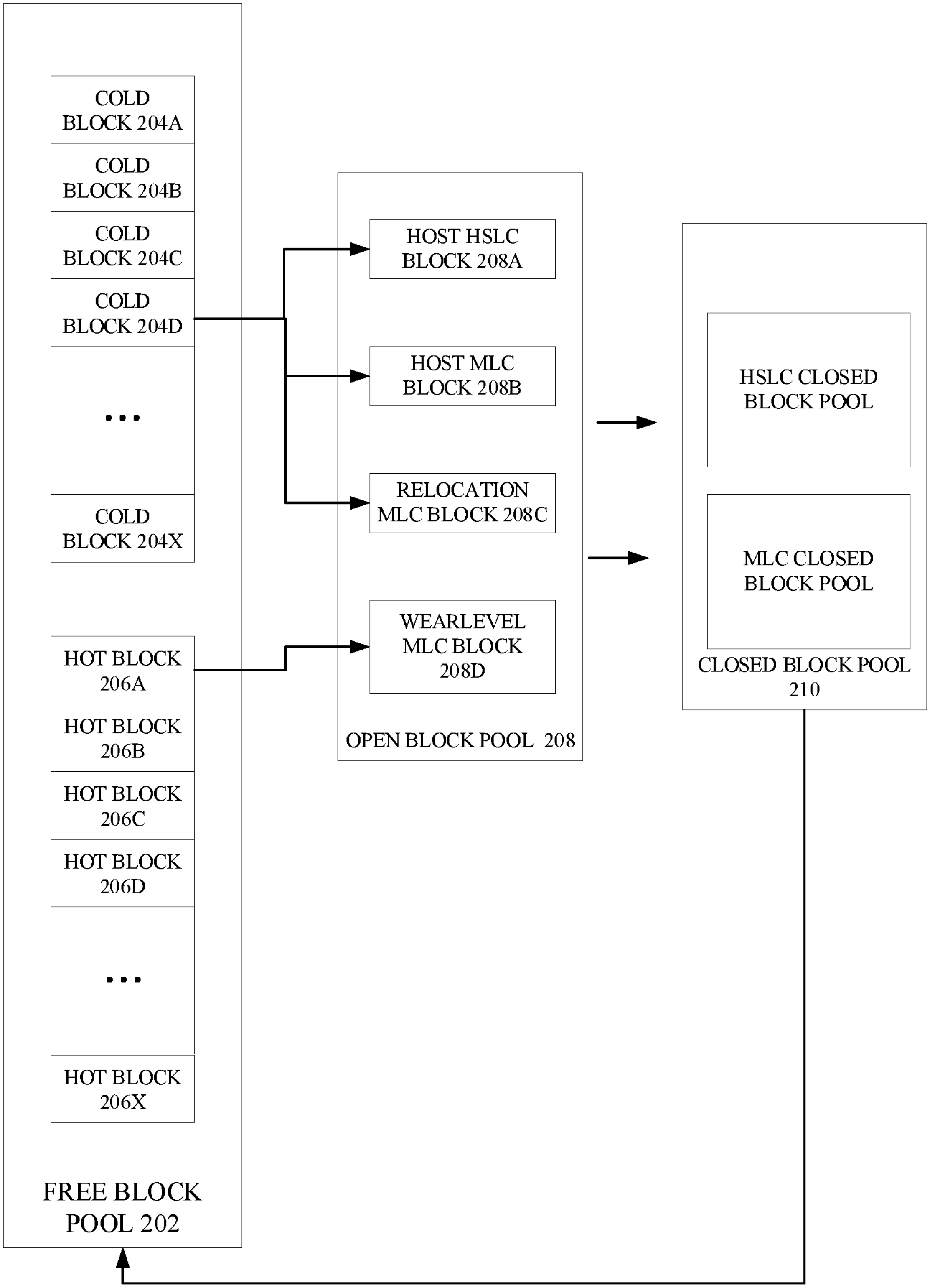
FIGS. 2A and 2B are block diagrams showing a prioritized hybrid approach of block allocation during wear leveling on a storage device operating in a sub-block mode in accordance with some implementations.
Figure 2B:
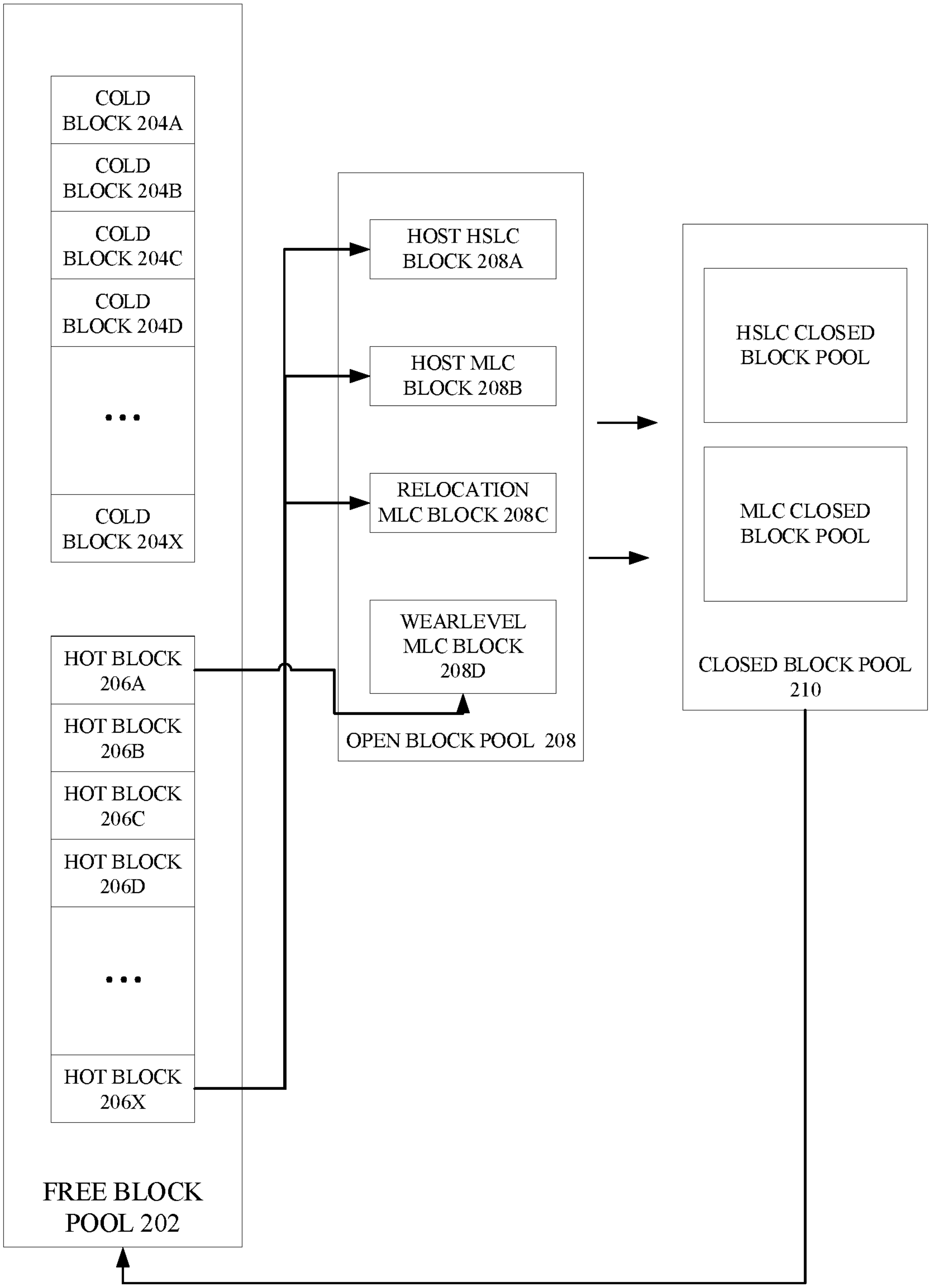

FIGS. 2A and 2B are block diagrams showing a prioritized hybrid approach of block allocation during wear leveling on a storage device operating in a sub-block mode in accordance with some implementations. In executing wear leveling operations, controller may maintain a free block pool 202, an open block pool 208, and a closed block pool 210. Free block pool 202 may include a list of cold blocks (shown as 204A-204X and also referred to generally herein as cold blocks 204) and a list of hot blocks (shown as 206A-206X and also referred to generally herein as hot blocks 206). The list of cold blocks 204 may be sorted from cold to coldest, with, for example, cold block 204A being the coldest block. The list of hot blocks 206 may be sorted from hot to hottest, with, for example, hot block 206A being the hottest block. Open block pool 208 may include a host hybrid SLC (HSLC) block 208A, a host MLC block 208B, and a relocation MLC block 208C, each of which may be allocated for MLC flow operations. Open block pool 208 may also include wear level MLC block 208D which may be used as a destination block during wear leveling operations.

In FIG. 2A, when executing a wear leveling algorithm, controller 108 may select the hottest block, i.e., hot block 206A from the list of hot blocks 206 to be used as a destination block during wear leveling. As such, hot block 206A may be allocated as wear level MLC block 208D. Rather than selecting the coldest block for MLC flows, when controller 108 determines that a sub-block has a PEC value that is greater than the sister sub-block threshold, controller may select a sister sub-block from the list of cold blocks 204 for the sub-block with a PEC value that is greater than the sister sub-block threshold. For example, if controller determines that the sister sub-block for cold block 204D has a PEC value that is greater than the sister sub-block threshold, rather than selecting cold block 204A (i.e., the coldest block in the cold block list 204), controller 108 may select sub-block 204D for MLC flows.

Controller 108 may allocate the selected cold sub-block, i.e., cold block 204D as a host HSLC block 208A, a host MLC block 208B, and/or a relocation MLC block 208C to increase the PE cycles on cold block 204D, increase the PEC value of cold block 204D and reduce the difference in the PEC values associated with cold block 204D and its sister sub-block with a PEC that is greater than the sister sub-block threshold. The hottest block selected as the destination block, i.e., block 204A, and the selected cold sub-block, i.e., block 204D, may be moved to a closed block pool 210 and after operations such as compaction are performed, the blocks in the closed block 210 pool may be added to the free block pool 202.

In FIG. 2B, when executing a wear leveling algorithm, controller 108 may also select the hottest block, i.e., hot block 206A from the list of hot blocks 206 to be used as a destination block during wear leveling. Rather than selecting the coldest block for MLC flows, when controller 108 determines that a sub-block has a PEC value that is greater than the sister sub-block threshold, controller may select a sister sub-block from free block pool 202. For example, the sister block for the sub-block with a PEC value that is greater than the sister sub-block threshold may be hot block 206X in the list of hot blocks 206. As such, rather than selecting a cold block for MLC flows, controller 108 may select the sister sub-block for a sub-block with PEC value that is greater than the sister sub-block threshold from anywhere in free block pool 202.

Controller 108 may allocate the selected sub-block, i.e., hot sub-block 206X as a host HSLC block 208A, a host MLC block 208B, and/or a relocation MLC block 208C to increase the PE cycles on hot block 206X, increase the PEC value of hot block 206X and reduce the difference in the PEC values associated with hot block 206X and its sister sub-block with a PEC that is greater than the sister sub-block threshold. The destination block, i.e., block 206A, and the selected sub-block, i.e., hot sub-block 206X may be moved to a closed block pool 210 and after operations such as compaction are performed, the blocks in the closed block 210 pool may be added to the free block pool 202. As indicated above FIGS. 2A and 2B are provided as examples. Other examples may differ from what is described in FIGS. 2A and 2B.

Figure 3:
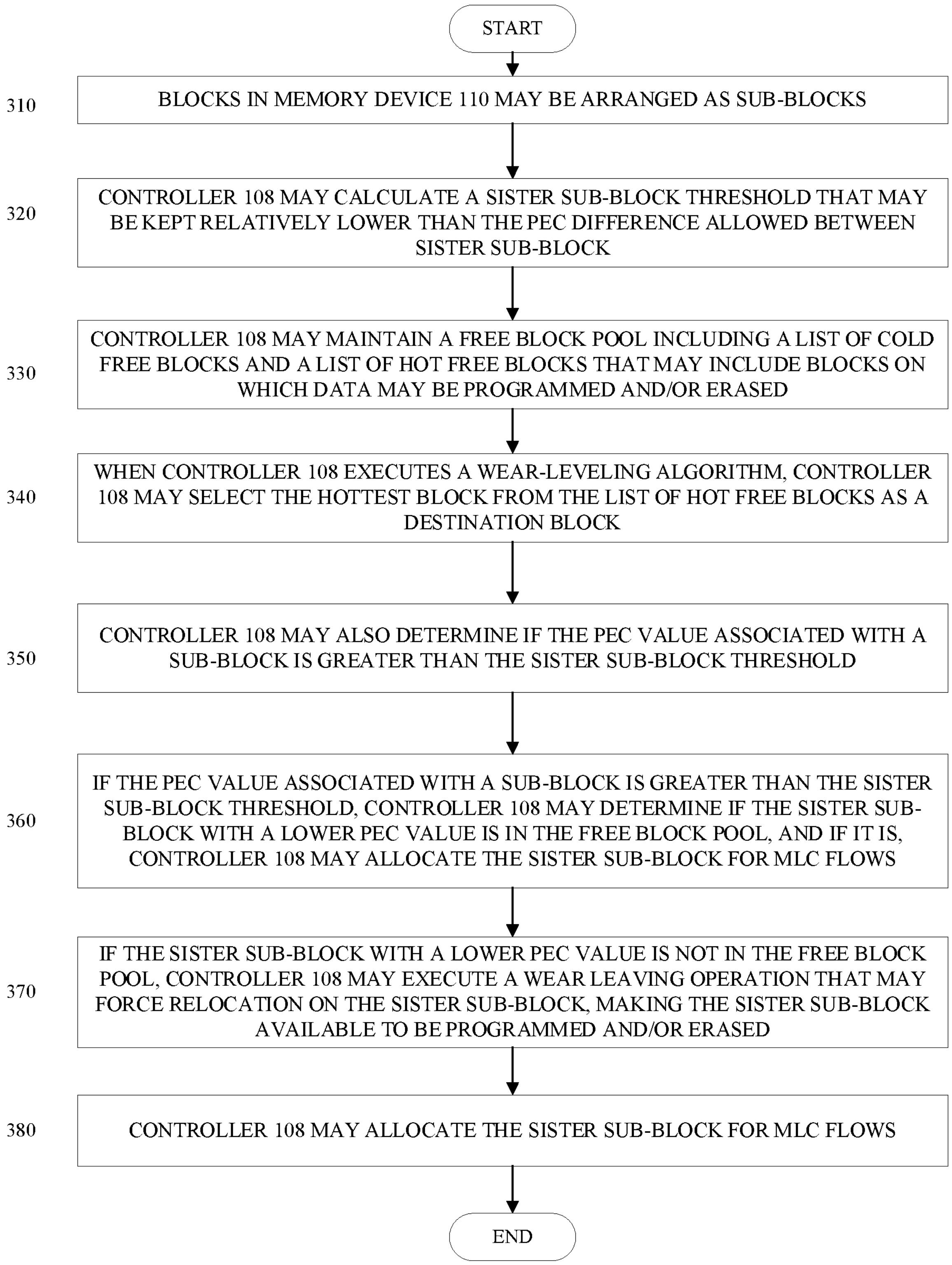
FIG. 3 is a flow diagram of an example process of a prioritized hybrid approach of block allocation during wear leveling on a storage device operating in a sub-block mode in accordance with some implementations.

FIG. 3 is a flow diagram of an example process of a prioritized hybrid approach of block allocation during wear leveling on a storage device operating in a sub-block mode in accordance with some implementations. At 310, blocks in memory device 110 may be arranged as sub-blocks. At 320, controller 108 may calculate a sister sub-block threshold that may be kept relatively lower than the PEC difference allowed between sister sub-blocks. At 330, controller 108 may maintain a free block pool including a list of cold free blocks and a list of hot free blocks that may include blocks on which data may be programmed and/or erased. At 340, when controller 108 executes a wear-leveling algorithm, controller 108 may select the hottest block from the list of hot free blocks as a destination block. At 350, controller 108 may also determine if the PEC value associated with a sub-block is greater than the sister sub-block threshold. At 360, if the PEC value associated with a sub-block is greater than the sister sub-block threshold, controller 108 may determine if the sister sub-block with a lower PEC value is in the free block pool, and if it is, controller 108 may allocate the sister sub-block for MLC flows. At 370, if the sister sub-block with a lower PEC value is not in the free block pool, controller 108 may execute a wear leaving operation that may force relocation on the sister sub-block, making the sister sub-block available to be programmed and/or erased. At 380, controller 108 may allocate the sister sub-block for MLC flows. As indicated above FIG. 3 is provided as an example. Other examples may differ from what is described in FIG. 3.

Figure 4:
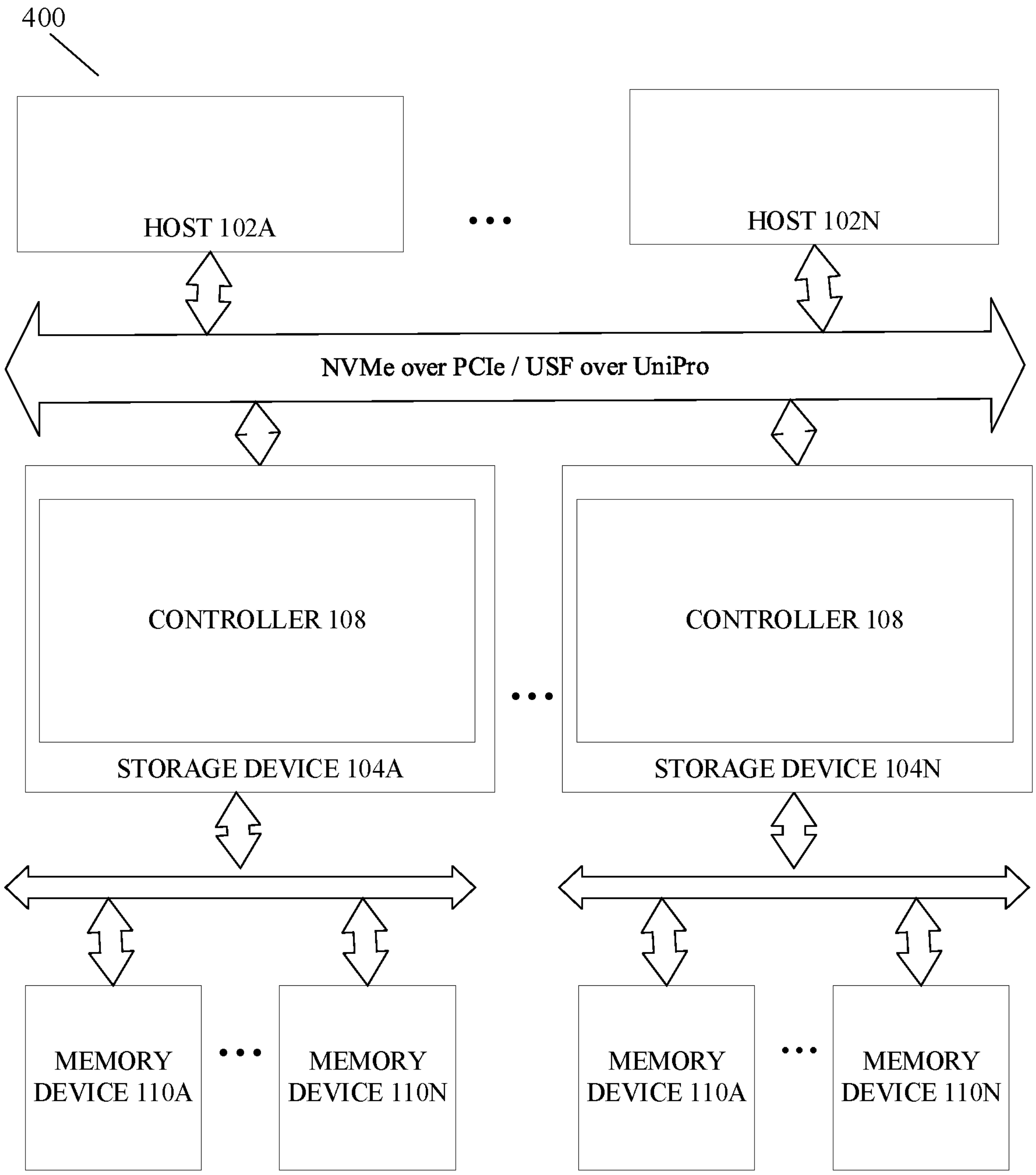
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102*n* (referred to herein as host(s) 102), and storage devices 104*a*-104*n* (referred to herein as storage device(s) 104).

Storage device 104 may include a controller 108 to manage the resources on storage device 104. Controller 108 may execute sub-block wear leveling to accommodate a condition such that sister sub-blocks may not have a PEC difference that is more than a set threshold. Hosts 102 and storage devices 104 may communicate via a Serial AT attachment (SATA) interface, Non-Volatile Memory Express (NVMe) over peripheral component interconnect express (PCI Express or PCIe) interface, the Universal Flash Storage (UFS) over Unipro, or the like.

Devices of Environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of Environment 400.

Figure 5:
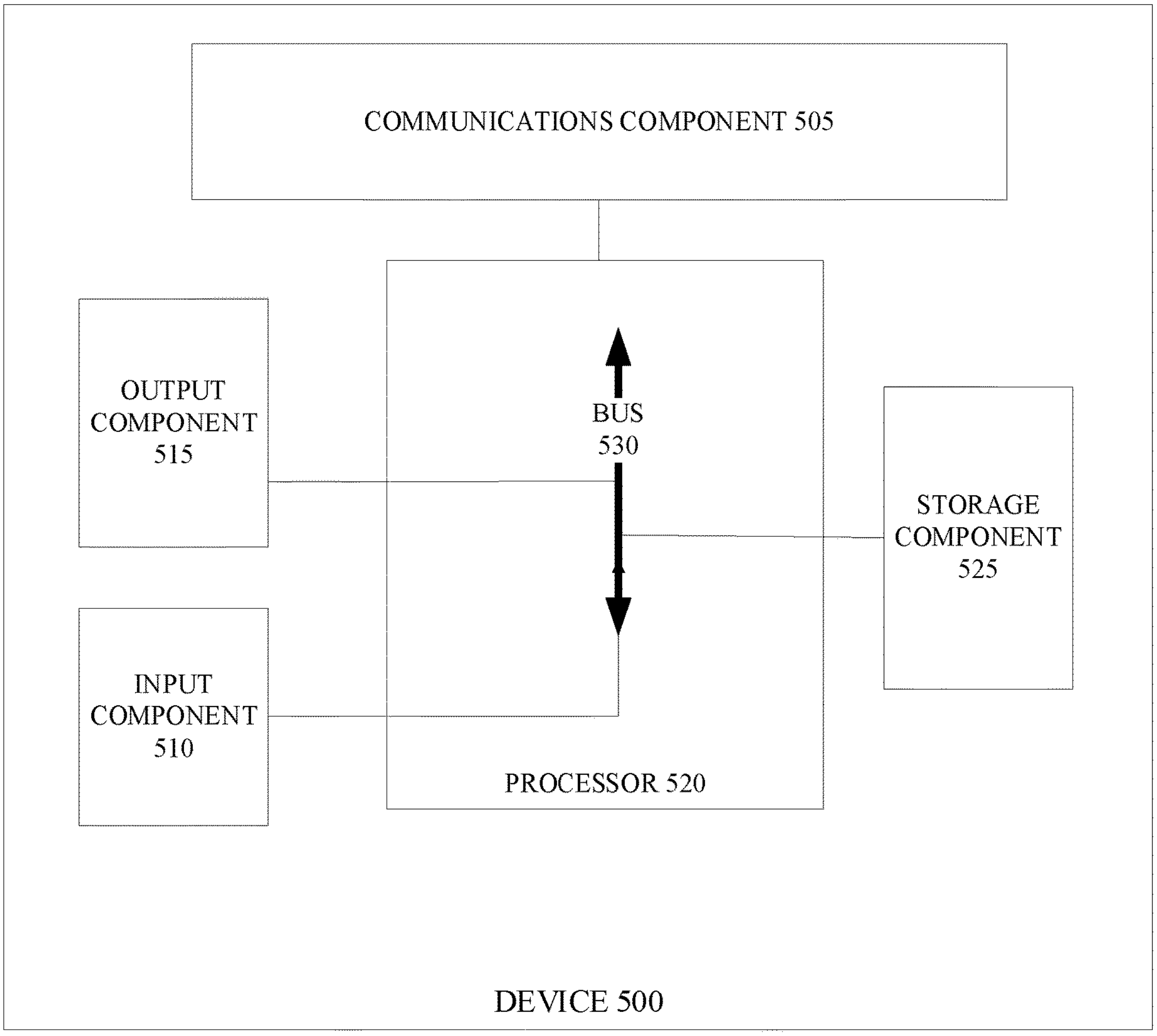
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM), read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more" The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to maintain data reliability between sub-blocks by executing wear leveling operations such that a program-erase count (PEC) difference between sister sub-blocks is reduced, the storage device comprises:

a memory device including blocks, at least one of which is divided into sister sub-blocks; and a controller to calculate a sister sub-block threshold and process a wear leveling operation, wherein a destination block is selected, and a first sister sub-block is prioritized for a multi-layer cell (MLC) flow when the PEC value of a second sister sub-block is greater than the sister sub-block threshold, wherein by prioritizing the first sister sub-block for the MLC flow, the controller reduces a difference in PEC values associated with sister sub blocks while tackling the sub block wear leveling.

2. The storage device of claim 1, wherein the sister sub-block threshold is calculated based on the memory device and the sister sub-block threshold is lower than an allowed PEC difference between the first sister sub-block and the second sister sub-block.

3. The storage device of claim 1, wherein the controller maintains a free block pool that includes blocks on which data may be programmed and erased and the free block pool includes a list of cold free blocks and a list of hot free blocks.

4. The storage device of claim 1, wherein the destination block is a hottest block on a list of hot free blocks.

5. The storage device of claim 1, wherein when the PEC value associated with the second sister sub-block is greater than the sister sub-block threshold and the controller determines that the first sister sub-block is in a free block pool, the controller prioritizes allocation of the first sister sub-block for the MLC flow.

6. The storage device of claim 1, wherein when the PEC value associated with the second sister sub-block is greater than the sister sub-block threshold and the controller determines that the first sister sub-block is not in a free block pool, the controller forces relocation on the first sister sub-block and prioritizes allocation of the first sister sub-block for the MLC flow.

7. The storage device of claim 1, wherein by prioritizing the first sister sub-block for the MLC flow, the controller increases a rate of program-erase cycles on the first sister sub-block and increases a PEC value for the first sister sub-block.

8. The storage device of claim 1, wherein by prioritizing the first sister sub-block for the MLC flow, the controller allocates the first sister sub-block as one of a host hybrid single-layer cell block, a host MLC block, and a relocation MLC block.

9. The storage device of claim 1, wherein the controller maintains an open block pool including a host hybrid single-layer cell block, a host MLC block, a relocation MLC block, and a wear leveling MLC block.

10. The storage device of claim 1, wherein the controller allocates the destination block as a wear level MLC block.

11. A method for maintaining data reliability between sub-blocks by executing wear leveling operations on a storage device such that a program-erase count (PEC) difference between sister sub-blocks is reduced, wherein a controller on the storage device executes the method comprising:

- determining that a memory device is divided into sister sub-blocks;
- calculating a sister sub-block threshold;
- selecting a destination block for wear leveling; and
- prioritizing allocation of a first sister sub-block for a multi-layer cell (MLC) flow when the PEC value of a second sister sub-block is greater than the sister sub-block threshold, wherein by prioritizing the first sister sub-block for the MLC flow, the controller reduces a difference in PEC values associated with sister sub blocks while tackling the sub block wear leveling.

12. The method of claim 11, wherein the calculating comprises calculating the sister sub-block threshold based on the memory device and calculating the sister sub-block threshold to be lower than an allowed PEC difference between the first sister sub-block and the second sister sub-block.

13. The method of claim 11, wherein the selecting comprises selecting a hottest block from a free block pool as the destination block.

14. The method of claim 11, wherein the prioritizing comprises prioritizing allocation of the first sister sub-block for the MLC flow when the PEC value associated with the second sister sub-block is greater than the sister sub-block threshold and the first sister sub-block is in a free block pool.

15. The method of claim 11, wherein the prioritizing comprises forcing relocation on the first sister sub-block and prioritizing allocation of the first sister sub-block for the MLC flow when the PEC value associated with the second sister sub-block is greater than the sister sub-block threshold and the first sister sub-block is not in a free block pool.

16. The method of claim 11, further comprising maintaining an open block pool including a host hybrid single-layer cell block, a host MLC block, a relocation MLC block, and a wear leveling MLC block.

17. The method of claim 11, wherein the selecting comprises allocating the destination block as a wear level MLC block.

18. A method for maintaining data reliability between sub-blocks by executing wear leveling operations on a storage device such that a program-erase count (PEC) difference between sister sub-blocks is reduced, wherein a controller on the storage device executes the method comprising:

- determining that a memory device is divided into sister sub-blocks;
- calculating a sister sub-block threshold;
- maintaining a free block pool and an open block pool;
- selecting a destination block for wear leveling from the free block pool and allocating the destination block as a wear level block in the open block pool; and
- prioritizing allocation of a first sister sub-block for a multi-layer cell (MLC) flow when the PEC value of a second sister sub-block is greater than the sister sub-block threshold, wherein the first sister block is allocated as one of a host hybrid single-layer cell block, a host MLC block, and a relocation MLC block.

19. The method of claim 18, wherein the prioritizing comprises:

- prioritizing allocation of the first sister sub-block for the MLC flow when the PEC value associated with the second sister sub-block is greater than the sister sub-block threshold and the first sister sub-block is in a free block pool; and
- forcing relocation on the first sister sub-block and prioritizing allocation of the first sister sub-block for the MLC flow when the PEC value associated with the second sister sub-block is greater than the sister sub-block threshold and the first sister sub-block is not in a free block pool.

* * * * *